United States Patent [19]

Maekawa

[11] 4,206,591

[45] Jun. 10, 1980

[54] WATCHGLASS FIXING STRUCTURE FOR TIMEPIECE

[75] Inventor: Yasuo Maekawa, Tokyo, Japan

[73] Assignee: Citizen Watch Company Limited, Tokyo, Japan

[21] Appl. No.: 907,465

[22] Filed: May 19, 1978

[30] Foreign Application Priority Data

May 31, 1977 [JP] Japan ............................ 52-70185[U]

[51] Int. Cl.$^2$ ...................... G04B 37/08; G04B 39/00; G01D 11/26; G01L 19/14

[52] U.S. Cl. ...................................... 368/295; 73/431; 368/286

[58] Field of Search ............ 58/88 R, 91, 90 R, 90 B, 58/52-53; 73/431

[56] References Cited

U.S. PATENT DOCUMENTS

| | | | |
|---|---|---|---|
| 2,332,458 | 10/1943 | Muney et al. | 58/90 R |
| 3,355,875 | 12/1967 | Jeanmonod et al. | 58/91 |
| 3,858,388 | 1/1975 | Fujimori et al. | 58/91 |
| 3,934,402 | 1/1976 | Fujimori | 58/90 R |
| 4,132,062 | 1/1979 | Fujimori | 58/90 R |

FOREIGN PATENT DOCUMENTS 1211411 2/1966 Fed. Rep. of Germany ............ 73/431

*Primary Examiner*—Edith S. Jackmon

*Attorney, Agent, or Firm*—Jordan and Hamburg

[57] ABSTRACT

A watchglass fixing structure in which a watchglass fixing member is provided with an annular groove having a groove width approximately equal to the combined thicknesses of the outer diametric portion of a watchglass and the outer circumferential portion of a backing ring, a flange at the upper portion of said annular groove, the inner diameter of the flange being smaller than the outer diameter of said watchglass, and with an inner circumferential surface at the lower portion of said annular groove, the diameter of the inner circumferential surface being larger than the outer diameter of said watchglass. The watchglass is fitted into an upper half of said annular groove of said watchglass fixing member through a waterproof packing, while the outer circumferential portion of said backing ring is inserted into a lower half of said annular groove.

9 Claims, 7 Drawing Figures

WATCHGLASS FIXING STRUCTURE FOR TIMEPIECE

This invention relates to a watch case and, more particularly, to a fixing structure for fixedly retaining the watchglass of a timepiece.

A conventional structure for fixing a watchglass made use of a synthetic resin packing ring. The synthetic resin packing ring is compressed between the outer circumference of a watchglass and the inner circumference of a case band, whereby the watchglass and packing are fixed against axial movement by the frictional force existing between them, while the packing ring and case band are fixed against axial movement by the frictional force existing between them. Since the fixing force between the packing ring and case band in this instance is greater than that between the watchglass and the packing ring, the force which fixes the watchglass against axial movement is decided by the frictional force between the watchglass and the packing ring hence, the packing ring must be subjected to a large compressing force in the direction of its diameter in order to provide a sufficient fixing force and water-tight seal over a long period of time. However, when a large amount of compression is applied, the packing ring protrudes excessively in the upward direction at the time that it is press-fitted about the outer circumference of the watchglass. It is therefore not possible to obtain reliable fixing force and water-proofness.

It is, therefore, an object of the present invention to provide an improved fixing structure for fixing a watchglass of a timepiece.

It is another object of the present invention to provide a fixing structure adapted to fixedly retain a watchglass onto watchglass fixing member such as a bezel or case band of a timepiece.

It is another object of the present invention to provide a fixing structure for a timepiece, which structure provides a reliable fixing force and waterproofness.

These and other objects, features and advantages of the present invention will become more apparent from the following description when taken in conjunction with the accompanying drawings, in which.

Figure 1:
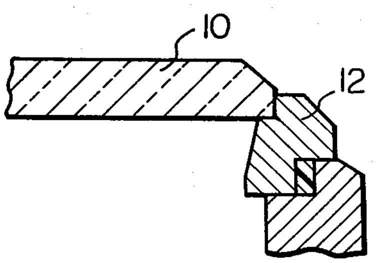
Fig. 1 PRIOR ART
FIG. 1 is a cross sectional view of one example of a prior art watchglass fixing structure.
Figure 2:
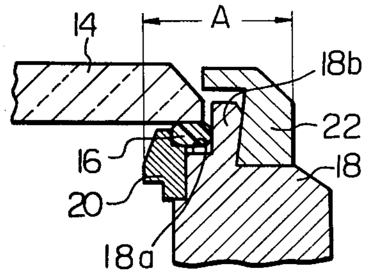
Fig. 2 PRIOR ART
FIG. 2 is a cross sectional view of another example of a prior art watchglass fixing structure.
Figure 3:
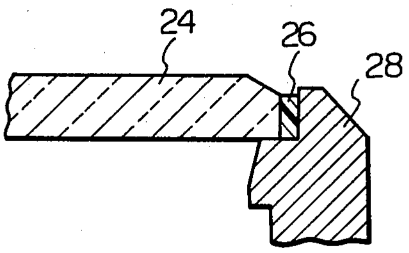
Fig. 3 PRIOR ART
FIG. 3 is a cross sectional view of another example of a prior art watchglass fixing structure.

FIG. 1 shows an example of a conventional watchglass fixing structure. In FIG. 1, a watchglass 10 is fixed to a metal ring or bezel 12 serving as a glass fixing member by means of an adhesive. Some of the defects encountered in the structure of this type were a water-tight seal with little reliability and a fixing force that was uncertain because of degradation of the bonding force of the adhesive with the passage of time. In FIG. 2, which shows another prior art, watchglass 14 is retained by means of a packing ring 16 which is fit on the upper surface of a stepped portion 18*a* of a case band 18. A retaining or backing ring 20 is mounted on an inner wall of the case band 18, to retain the packing ring 16 in a fixed place, and a watchglass bezel 22 is press fitted to an upper portion 18*b* of the case band 18. Here, the distance A from the inner diameter of the backing ring 20 to the outer diameter of the bezel 22 is long, a defect is encountered in terms of appearance since dress watches demand a narrow rim. In the structure of FIG. 3 which shows still another prior art, a rigid packing ring 26 is fit about an inner circumferential portion of case band 28 and a watchglass 24 is press-fitted into the packing ring 26. This structure was disadvantageous in that the fixing force of the watchglass 24 was uncertain and in that the packing ring 26 could be seen from outside the case, thereby detracting from the appearance of the timepiece.

The present invention seeks to overcome the above-mentioned shortcomings encountered in the prior art by means of watchglass fixing structure in which a watchglass is fit from below into an annular groove of a watchglass fixing member such as a watchglass bezel or case band through the intermediary of a waterproof packing ring, and wherein the elastically deformable backing ring is fit into the annular groove. This structure reliably prevents upward displacement of the watchglass while the waterproof packing ring assures a water-tight seal for a long period of time. The structure is also characterized by the improved appearance of the watchglass periphery.

Figure 4:
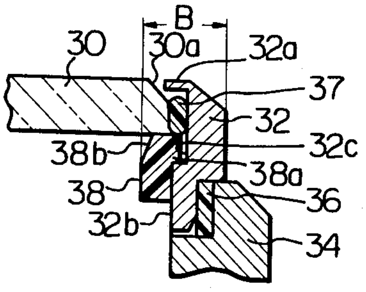
FIG. 4 is a cross sectional view of a preferred embodiment of a watchglass fixing structure in accordance with the present invention.

FIG. 4 shows, in cross-section, a preferred embodiment of watchglass fixing structure in accordance with the present invention to achieve the above concept. In FIG. 4, a watchglass 30 has an inclined surface 30*a* about the upper surface of its circumference. A watchglass fixing member such as a bezel 32 is secured to an upper portion of a case band 34 through a rigid packing 36. The bezel 32 includes on its inner side an inwardly extending flange 32*a* the diameter of which is less than the outer diameter of watchglass 30, an inner circumferential surface 32*b* the diameter of which is greater than the outer diameter of watchglass 30, and an annular groove 32*c* formed in the inner circumferential surface 32*b* at a position adjacent to flange 32*a*. A water proof packing ring 37 is disposed in the annular groove 32. A backing or retaining ring 38 has a radially outwardly extending annular projection 38*a*. The packing ring 37 is diametrically compressed between the outer periphery of watchglass 30 and inner diametric portion of annular groove 32*c*, thereby maintaining a water-tight seal therebetween. Watchglass 30 is fit into annular groove 32*c* through packing ring 37 and has the inclined surface 30*a* about the upper surface of its outer circumference in order to facilitate the fitting of the glass into the packing ring 37. Backing ring 38 is a made of a plastic material such as a synthetic resin for the sake of obtaining sufficient elastic deformability. This ring has an inner circumferential surface the diameter of which is less than the outer diameter of watchglass 30, the annular projection 38*a* having the diameter substantially equal to that of the inner diameter of annular flange 32*a* of the bezel 32. The ring 38 also has an inclined surface 38*b* formed about an upper portion of the ring 38. The annular projection 38*a* of the backing ring 38 fits into annular groove 32*c* below the bottom surfaces of watchglass 30 and waterproof packing 37, thereby preventing downward displacement of watchglass 30 and waterproof packing 37.

The assembly proceeds as follows. Waterproof packing 37 is disposed in the upper half of annular groove 32*c*, and watchglass 30 is press-fitted into waterproof packing 37. At this time, the inclined surface 30*a* abuts the flange 32*a* so that the watchglass 30 can not fall out of bezel 32, and packing 37 is compressed between the outer diametric portion of the watchglass 30 and the inner diametric portion of annular groove 32*c*, whereby providing a water-tight seal therebetween. Next, backing ring 38 while in the inwardly deformed state is slid along the inner circumferential surface 32*b* of bezel 32 until the outer circumferential portion or annular projection 38*a* of the backing ring 38 is inserted into the lower half of annular groove 32*c* below the bottom surfaces of watchglass 30 and waterproof packing 37. The press-fitting of the bezel 32 into the case band 34 through the rigid packing 36 completes the assembly operation. Disassembly is accomplished merely by reversing the foregoing procedure.

Figure 5:
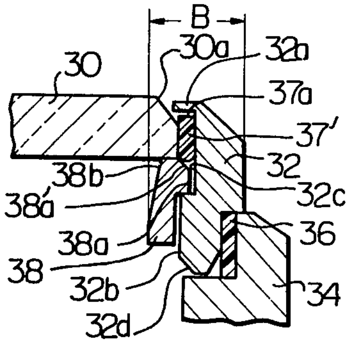
FIG. 5 is a cross sectional view of a modified form of the structure shown in FIG. 4.

FIG. 5 shows a modified form of the structure shown in FIG. 4, with like parts bearing the same reference numerals as those used in FIG. 4. In this modification, the backing ring 38 comprises a metal ring and has an inclined guiding surface 38'*a* formed about an upper portion of the annular projection 38*a*, and the bezel 32 has an inclined guiding surface 32*d* about a lower portion of the bezel 32. Other construction is similar to that shown in FIG. 4 and therefore its detailed description is omitted. With this construction, waterproof packing 37 having a D-shaped cross-section is disposed in the upper half of annular groove 32*c* of bezel 32 such that a horizontal or radially extending portion 37*a* of the packing 37 is facing upward. Next, watchglass 30 and then backing ring 38, are disposed into bezel 32. The backing ring 38 is then pressed downward so that both the watchglass 30 and backing ring 38 are held in place as shown in FIG. 5. Since the horizontal portion 37*a* of packing 37 is facing upward, the packing does not become distorted at the time of the pressing step. Moreover, watchglass 30 owing to its inclined surface 30*a* is inserted into packing 37 which is thus compressed between the outer diametric portion of the watchglass 30 and the inner diametric portion of annular groove 32*c*, thereby providing a water-tight seal therebetween. Meanwhile, backing ring 38 undergoes slight inwardly directed elastic distortion by virtue of inclined guiding surfaces 32*d*, 38'*a* and, after being slid along the inner circumferential surface 32*b* of bezel 32, is inserted into the lower half of annular groove 32*c*. Thus, watchglass 30 is reliably fixed since its inclined surface 30*a* abuts flange 32*a* and its bottom surface abuts the backing ring 38.

Figure 6:
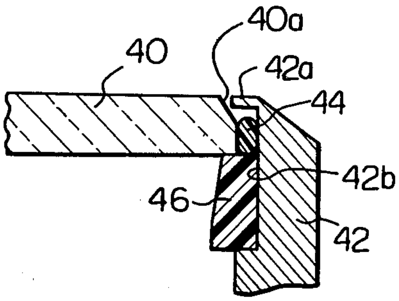
FIG. 6 is a cross sectional view of another preferred embodiment of a watchglass fixing structure in accordance with the present invention.

Although the structures shown in FIGS. 4 and 5 show the watchglass being fit into the bezel, it is also possible for the watchglass 40 to be fit directly into the case band 42, as depicted in FIG. 6.

In FIG. 6, the case band 42 serves as a watchglass fixing member and has an inwardly directed annular flange 42*a* and an inwardly facing annular groove 42*b*. A backing 46, which is made of a plastic material such as a synthetic resin, is disposed in the annular groove 42*b* to retain the watchglass 40 and packing 44 in place.

Figure 7:
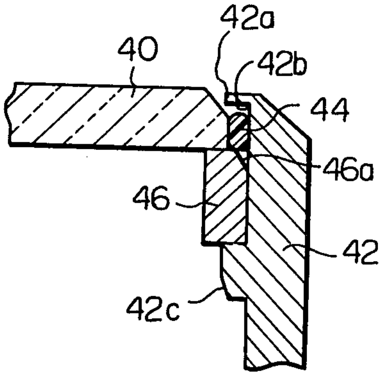
FIG. 7 is a cross sectional view of a modified form of the structure shown in FIG. 6.

FIG. 7 shows a modification of the structure shown in FIG. 6, with like parts bearing the same reference numerals as those used in FIG. 6. In this modification, the base band 42 has an inclined guiding surface 42*c*, and the backing ring 46 is made of metal and has an inclined guiding surface 46*a*, so as to provide an ease of assembly. The effects of the backing ring 46 can be improved by subjecting its inside surface to a surface treatment such as a coating or plating, or by adopting a backing ring which is transparent.

In accordance with the present invention as described above, a shorter distance B is obtained between the inner diameter of the elastically deformable backing ring and the outer diameter of the watchglass fixing member such as a bezel or case band. This improves the appearance about the outer periphery of the watchglass, removes the need for finishing and has the added advantage of an attractive design. Since it is not necessary to fix the backing ring to the watchglass fixing member by camfering or press-fitting, limitations upon design and working can be eliminated. Employing the backing ring to insert the watchglass during the assembly procedure facilitates the procedure and prevents contamination of the glass since it is not directly contacted by hand or by tools. Moreover, no adhesives are used so that the water-tight seal remains intact for a long period of time. This is also an advantage in terms of after service since the watchglass can be easily removed.

What is claimed is:

1. A structure for fixing a watchglass of a timepiece, comprising:
   - a watchglass fixing member including a radially, inwardly extending annular flange formed at an upper portion of said watchglass fixing member, and an inner circumferential surface having an inwardly facing annular groove formed at a position adjacent to said annular flange;
   - a waterproof packing disposed in said annular groove and compressed between an outer periphery of said watchglass and an inner periphery of said annular groove; and
   - a backing ring including a radially outwardly extending annular projection fitted into said annular groove, said backing ring having its top surface engaging bottom surfaces of said watchglass and said waterproof packing, thereby preventing downward displacement of said watchglass and said waterproof packing.

2. A structure according to claim 1, in which said backing ring is made of a synthetic resin.

3. A structure according to claim 1, in which said backing ring is made of a metal.

4. A structure according to claims 1, 2 or 3, in which said watchglass fixing member comprises a bezel in which said annular flange and said annular groove are formed, and a case band to which said bezel is fixed.

5. A structure for fixing a watchglass of a timepiece, comprising:
   - a watchglass fixing member including a radially, inwardly extending annular flange formed at an upper portion of said watchglass fixing member, and an inner circumferential surface having an inwardly facing annular groove formed at a position adjacent to said annular flange;
   - a waterproof packing disposed in an upper half portion of said annular groove and compressed between an outer periphery of said watchglass and an inner periphery of said annular groove; and
   - a plastic backing ring including a radially outwardly extending annular projection fitted into a lower half portion of said annular groove, said backing ring having its top surface engaging bottom surfaces of said watchglass and said waterproof packing, thereby preventing downward displacement of said watchglass and said waterproof packing.

6. A structure for fixing a watchglass of a timepiece, comprising:

a watchglass fixing member including a case band, and a bezel supported by said case band, said bezel having a radially, inwardly extending annular flange formed at an upper portion of said bezel, an inner circumferential surface having an inwardly facing annular groove formed at a position adjacent to said annular flange, and an inclined guiding surface formed about a lower portion of said bezel;

a waterproof packing disposed in an upper half portion of said annular groove and compressed between an outer periphery of said watchglass and an inner periphery of said annular groove; and a metallic backing ring including a radially outwardly extending annular projection fitted into said annular groove, said backing ring having an inclined guiding surface about an upper portion of said backing ring and having its top surface engaging bottom surfaces of said watchglass and said waterproof packing, thereby preventing downward displacement of said watchglass and said waterproof packing.

7. A structure for fixing a watchglass of a timepiece, comprising:

a case band including a radially, inwardly extending annular flange formed at an upper portion of said case band, and an inner circumferential surface having an inwardly facing annular groove formed at a position adjacent to said annular flange;

a waterproof packing disposed in an upper portion of said annular groove and compressed between an outer periphery of said watchglass and an inner periphery of said annular groove; and a backing ring fitted into a lower portion of said annular groove, said backing ring having its top surface engaging bottom surfaces of said watchglass and said waterprooof packing, thereby preventing downward displacement of said watchglass and said waterproof packing.

8. A structure according to claim 7, in which said backing ring is made of a synthetic resin.

9. A structure according to claim 7, in which said backing ring is made of a metal.

* * * * *